(12) United States Patent
Chundury et al.

(10) Patent No.: US 12,041,033 B2
(45) Date of Patent: Jul. 16, 2024

(54) AUTHORIZATION AND AUDIT CONTROL IN A MULTI-PROTOCOL IoT DOMAIN

(71) Applicant: Cisco Technology, Inc., San Jose, CA (US)

(72) Inventors: Jagadish Chundury, Chennai (IN); Venkat R, Bangalore (IN); Jaswanth D K, Mysore (IN)

(73) Assignee: Cisco Technology, Inc., San Jose, CA (US)

( * ) Notice: Subject to any disclaimer, the term of this patent is extended or adjusted under 35 U.S.C. 154(b) by 238 days.

(21) Appl. No.: 17/748,205

(22) Filed: May 19, 2022

(65) Prior Publication Data

US 2023/0379300 A1 Nov. 23, 2023

(51) Int. Cl.
*H04L 29/06* (2006.01)
*H04L 9/40* (2022.01)
*H04L 29/08* (2006.01)
*H04L 41/0226* (2022.01)

(52) U.S. Cl.
CPC ...... *H04L 63/0236* (2013.01); *H04L 41/0226* (2013.01)

(58) Field of Classification Search
CPC .................... H04L 63/0236; H04L 41/0226
USPC ........................................................... 726/12
See application file for complete search history.

(56) References Cited

U.S. PATENT DOCUMENTS

| 7,877,469 | B2 | 1/2011 | Fang et al. |
| 8,195,944 | B2 | 6/2012 | Sherburne et al. |
| 8,775,615 | B2 | 7/2014 | Jalaldeen et al. |
| 8,880,578 | B2 | 11/2014 | Porel et al. |
| 9,509,684 | B1 * | 11/2016 | Dixson-Boles ....... H04L 63/083 |
| 10,469,481 | B2 * | 11/2019 | Mahaffey .............. H04L 63/083 |
| 2002/0133581 | A1 * | 9/2002 | Schwartz ............ H04L 41/0213 709/223 |

(Continued)

FOREIGN PATENT DOCUMENTS

| CN | 1556638 A | * 12/2004 | |
| CN | 108777637 A | * 11/2018 | |
| WO | WO-2008067764 A1 | * 6/2008 | ............. H04L 12/24 |

OTHER PUBLICATIONS

"SNMP Custom MIB to Modbus RTU QuickServer Gateway", online: https://store.chipkin.com/products/snmp-custom-mib-to-modbus-rtu-quickserver-gateway, accessed May 19, 2022, 7 pages, Chipkin Automation Systems.

(Continued)

*Primary Examiner* — Haresh N Patel
(74) *Attorney, Agent, or Firm* — BEHMKE INNOVATION GROUP LLC; James M. Behmke; James J. Wong

(57) ABSTRACT

In one embodiment, an authorizing device (e.g., a gateway) receives a native protocol request packet from a requesting device destined to a serving device, and translates the native protocol request packet into an authorization protocol mapping. The authorizing device may then apply authorization protocol based authorization (e.g., OT protocol independent) to the native protocol request packet based on the authorization protocol mapping, and transmits the native protocol request packet toward the serving device in response to the authorization protocol mapping being authorized. In one embodiment, the techniques herein may also perform an audit in this manner.

20 Claims, 6 Drawing Sheets

(56) References Cited

U.S. PATENT DOCUMENTS

| | | | | |
|---|---|---|---|---|
| 2003/0014544 | A1* | 1/2003 | Pettey | H04L 69/168 709/230 |
| 2004/0204778 | A1 | 10/2004 | Lalapeth et al. | |
| 2007/0201508 | A1* | 8/2007 | Blackford | H04L 41/26 370/466 |
| 2010/0042689 | A1* | 2/2010 | Doggett | H04L 63/0218 709/206 |
| 2012/0311142 | A1* | 12/2012 | Stargardt | H04L 69/08 709/224 |
| 2019/0149618 | A1* | 5/2019 | Tsai | H04L 67/02 709/202 |
| 2020/0004690 | A1* | 1/2020 | Mathew | G06F 12/0813 |
| 2020/0204435 | A1* | 6/2020 | Matsui | H04L 69/22 |
| 2022/0406195 | A1* | 12/2022 | Janakiraman | G08G 5/0052 |

OTHER PUBLICATIONS

"SNMPv3 Gateways", online: https://www.csimn.com/CSI_pages/SNMP-Gateways.html, accessed May 19, 2022, 5 pages, Control Solutions Minnesota, Inc.

"Cisco Industrial Ethernet 5000 Hardened Aggregator Software Configuration Guide", online: https://www.cisco.com/c/en/us/td/docs/switches/lan/cisco_ie5000/software/release/15-2_2_eb/configuration/guide/scg-ie5000/swsnmp.html, Feb. 11, 2018. accessed May 19, 2022, 17 pages, Cisco Systems, Inc.

John, et al., "An XML-Based Framework for Dynamic SNMP MIB Extension", R. Stadler and B. Stiller (Eds.): DSOM'99, LNCS 1700, pp. 107-120, 1999, Springer-Verlag.

"Modbus/TCP", online: https://www.tofinosecurity.com/resources/protocols/modbus, accessed May 19, 2022, 4 pages, Tofino Security.

"Cisco UCS Central Authentication Guide, Release 2.0", May 16, 2017, 48 pages, Cisco Systems, Inc.

"MODBUS/TCP Security", Protocol Specification, online: https://modbus.org/docs/MB-TCP-Security-v21_2018-07-24.pdf, Jul. 2018, accessed May 19, 2022, 27 pages, Modbus.

"Evolving towards secure Modbus", online: https://www.incibe-cert.es/en/blog/evolving-towards-secure-modbus, Feb. 20, 2020, accessed May 19, 2022, 5 pages, Incibe.

"How to Send Modbus to Your SNMP Manager", online: https://www.dpstele.com/modbus/send-modbus-snmp-manager.php, accessed May 19, 2022, 3 pages, Digital Prototype Systems, Inc.

"GE Critical Power" User Manual—Uninterruptible Power Supply, SNMP/Web Adapter, Jan. 1, 2013, 74 pages, GE Consumer & Industrual SA.

* cited by examiner

500

510
- Modbus-SNMP-Authorization-Audit-FunctionCode-1-ReadCoil: 1.3.6.1.4.1.9.9.5001
- FunctionCode-1-Entry: 1.3.6.1.4.1.9.9.5001.1
- Modbus Data Address Start: 1.3.6.1.4.1.9.9.5001.1.1
- Modbus Data Address End: 1.3.6.1.4.1.9.9.5001.1.2
- FunctionCode-1-Audit-Attribute-1: 1.3.6.1.4.1.9.9.5001.1.3
- FunctionCode-1-Audit-Attribute-2: 1.3.6.1.4.1.9.9.5001.1.4
- FunctionCode-1-Audit-Attribute-3: 1.3.6.1.4.1.9.9.5001.1.5

520
- Modbus-SNMP-Authorization-Audit-FunctionCode-5-ForceSingleCoil: 1.3.6.1.4.1.9.9.5005
- FunctionCode-1-Entry: 1.3.6.1.4.1.9.9.5005.1
- Modbus Data Address Start: 1.3.6.1.4.1.9.9.5005.1.1
- Modbus Data Address End: 1.3.6.1.4.1.9.9.5005.1.2
- FunctionCode-1-Audit-Attribute-1: 1.3.6.1.4.1.9.9.5005.1.3
- FunctionCode-1-Audit-Attribute-2: 1.3.6.1.4.1.9.9.5005.1.4
- FunctionCode-1-Audit-Attribute-3: 1.3.6.1.4.1.9.9.5005.1.5

FIG. 5

AUTHORIZATION AND AUDIT CONTROL IN A MULTI-PROTOCOL IoT DOMAIN

TECHNICAL FIELD

The present disclosure relates generally to computer networks, and, more particularly, to authorization and audit control in a multi-protocol Internet of Things (IoT) domain.

BACKGROUND

An Operational Technology (OT) environment often consists of multi-vendor, multi-technology solutions. Many times in such environments, the co-existence of multi-IoT-protocols such as Modbus, Distributed Network Protocol 3 (DNP3), Profinet, etc. can be seen. On the other hand, enabling remote maintenance, typically outsourced to vendors and partners, is a common practice. This results in a great risk for attacks and loss of intellectual property (IP). Accordingly, authorization and auditing are key to protect IP loss.

Though there are authorization techniques proposed in the recent versions of IoT protocols, there are no authorization techniques defined to address legacy systems such as Modbus serial, SNMPv1/2, and DNP3 before DNP3-Security Architecture (DNP3-SA). Moreover, there are no known techniques or standards that define a common authorization mechanism across multiple IoT protocols, nor are there any audit techniques and standards defined across the OT protocols.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 is an example of a sample Modbus simple network management protocol (SNMP) management information base (MIB)

DESCRIPTION OF EXAMPLE EMBODIMENTS

Overview

Figure 1:
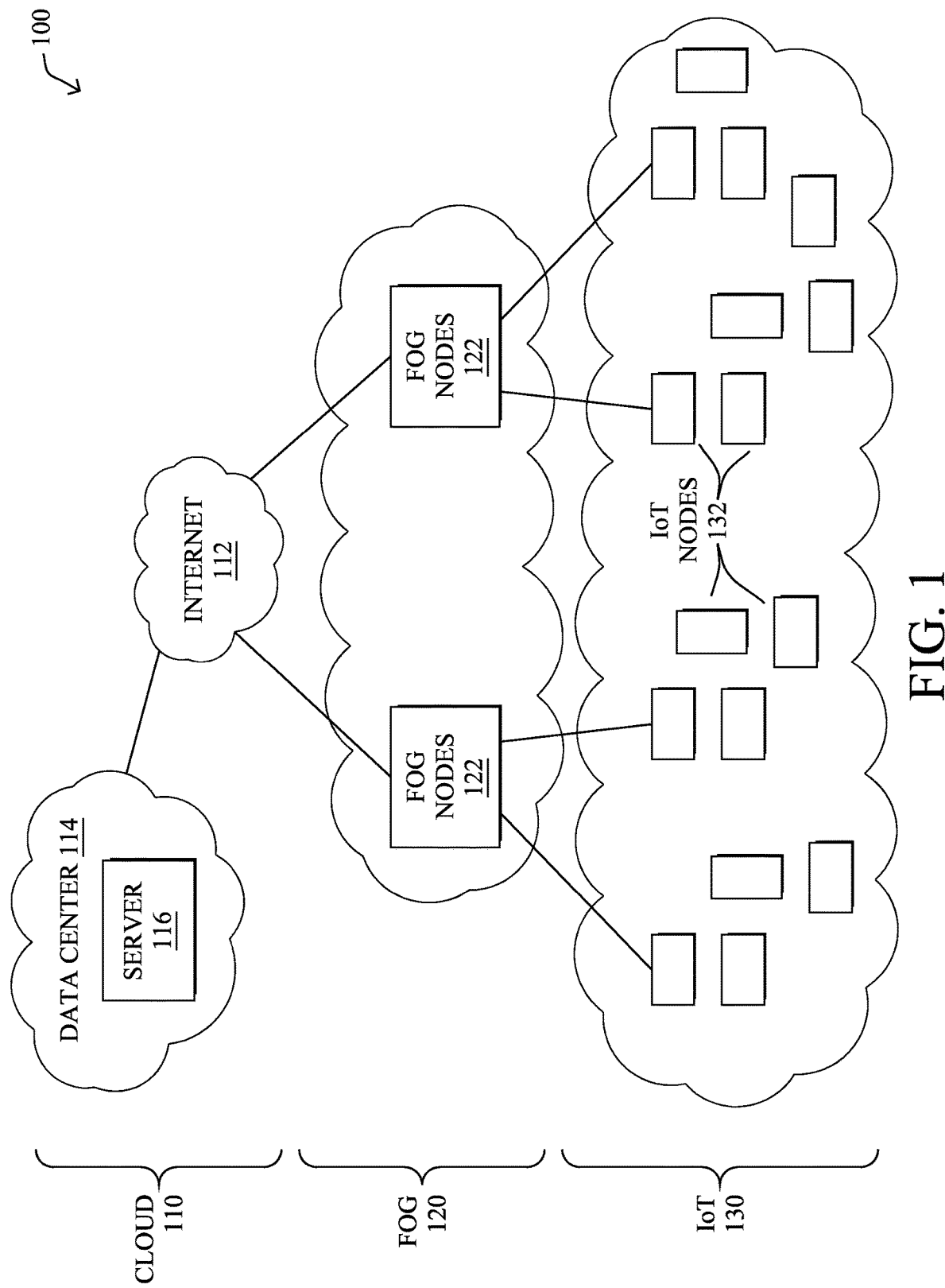
FIG. 1 illustrates an example communication network.

According to one or more embodiments of the disclosure, an authorizing device (e.g., a gateway) receives a native protocol request packet from a requesting device destined to a serving device, and translates the native protocol request packet into an authorization protocol mapping. The authorizing device may then apply authorization protocol based authorization (e.g., OT protocol independent) to the native protocol request packet based on the authorization protocol mapping, and transmits the native protocol request packet toward the serving device in response to the authorization protocol mapping being authorized. In one embodiment, the techniques herein may also perform an audit in this manner.

Other embodiments are described below, and this overview is not meant to limit the scope of the present disclosure.

Description

A computer network is a geographically distributed collection of nodes interconnected by communication links and segments for transporting data between nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication (PLC) networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Networks may also be, or may include, an "Internet of Things" or "IoT" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things"

thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

One type of IoT network is an Operational Technology (OT) network (e.g., an industrial control systems environment), where hardware and software are provided that detect or cause a change, through the direct monitoring and/or control of industrial equipment, assets, processes, and events.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, high bit error rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer or hierarchy of layers from local networks (e.g., IoT networks) to the cloud (e.g., centralized and/or shared resources, as will be understood by those skilled in the art). That is, generally, fog computing entails using devices at the network edge to provide application services, including computation, networking, and storage, in close proximity to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple peer-to-peer and hierarchical layers of fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog layer 120, and IoT layer 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Figure 2:
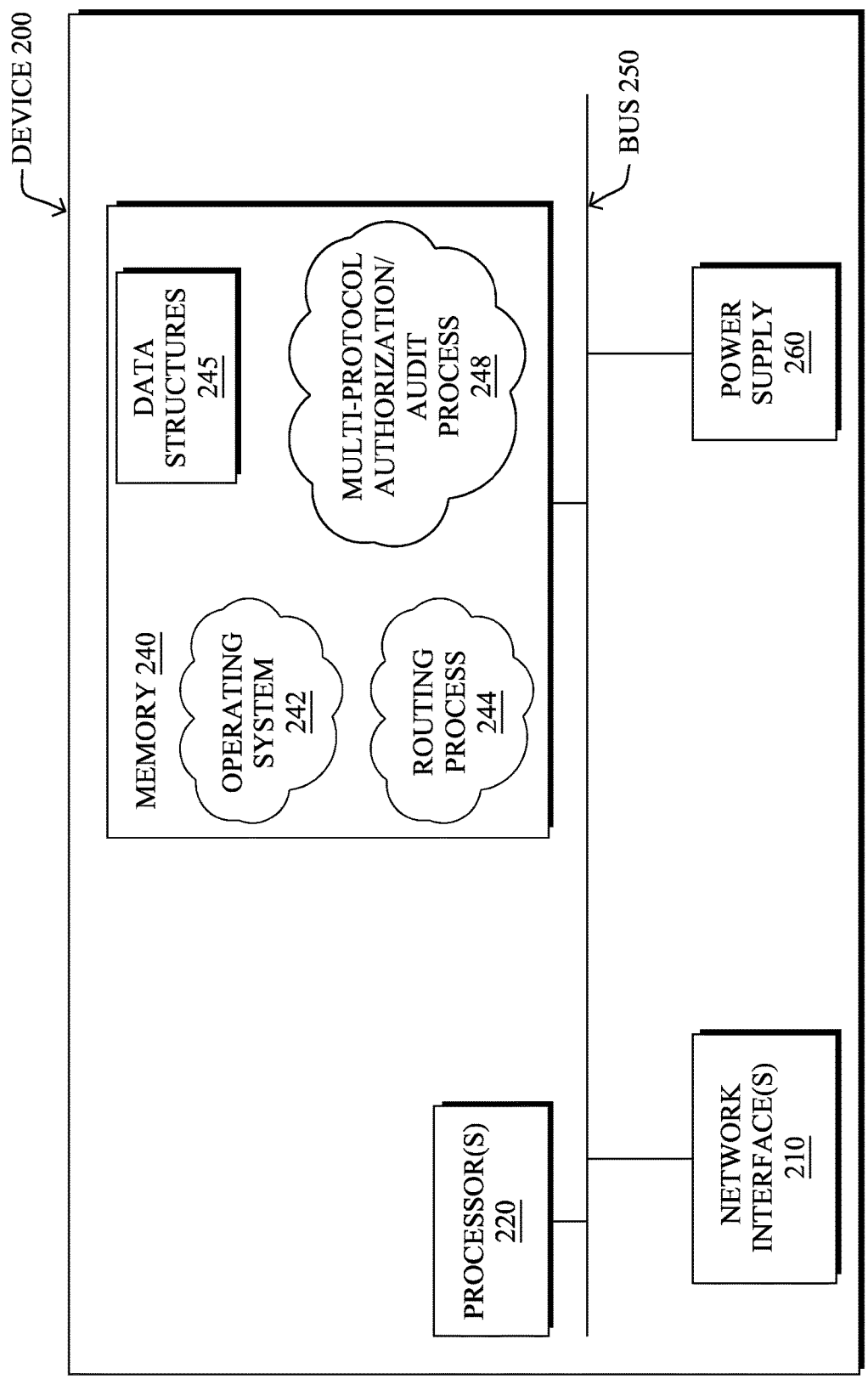
FIG. 2 illustrates an example network device/node.

FIG. 2 is a schematic block diagram of an example node/device 200 that may be used with one or more embodiments described herein, e.g., as any of the nodes/devices shown in FIG. 1 above. The device may comprise one or more network interfaces 210 (e.g., wired, wireless, power-line communication (PLC), etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections/interfaces 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise a routing process 244 and an illustrative "multi-protocol authorization/audit" process 248, as described herein. Note that while process 248 is shown in centralized memory 240 alternative embodiments provide for the process to be specifically operated within other components of the device 200.

Routing services/process 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among devices 200 using routing protocols, such as the conventional OSPF and IS-IS link-state protocols (e.g., to "converge" to an identical view of the network topology).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Authorization and Audit Control in a Multi-Protocol IoT Domain

As noted above, an Operational Technology (OT) environment often consists of multi-vendor, multi-technology solutions, and the co-existence of multi-IoT-protocols. As also noted above, there are currently no authorization techniques defined to address legacy systems or multiple IoT protocols, nor are there any audit techniques and standards defined across the OT protocols.

Figure 3:
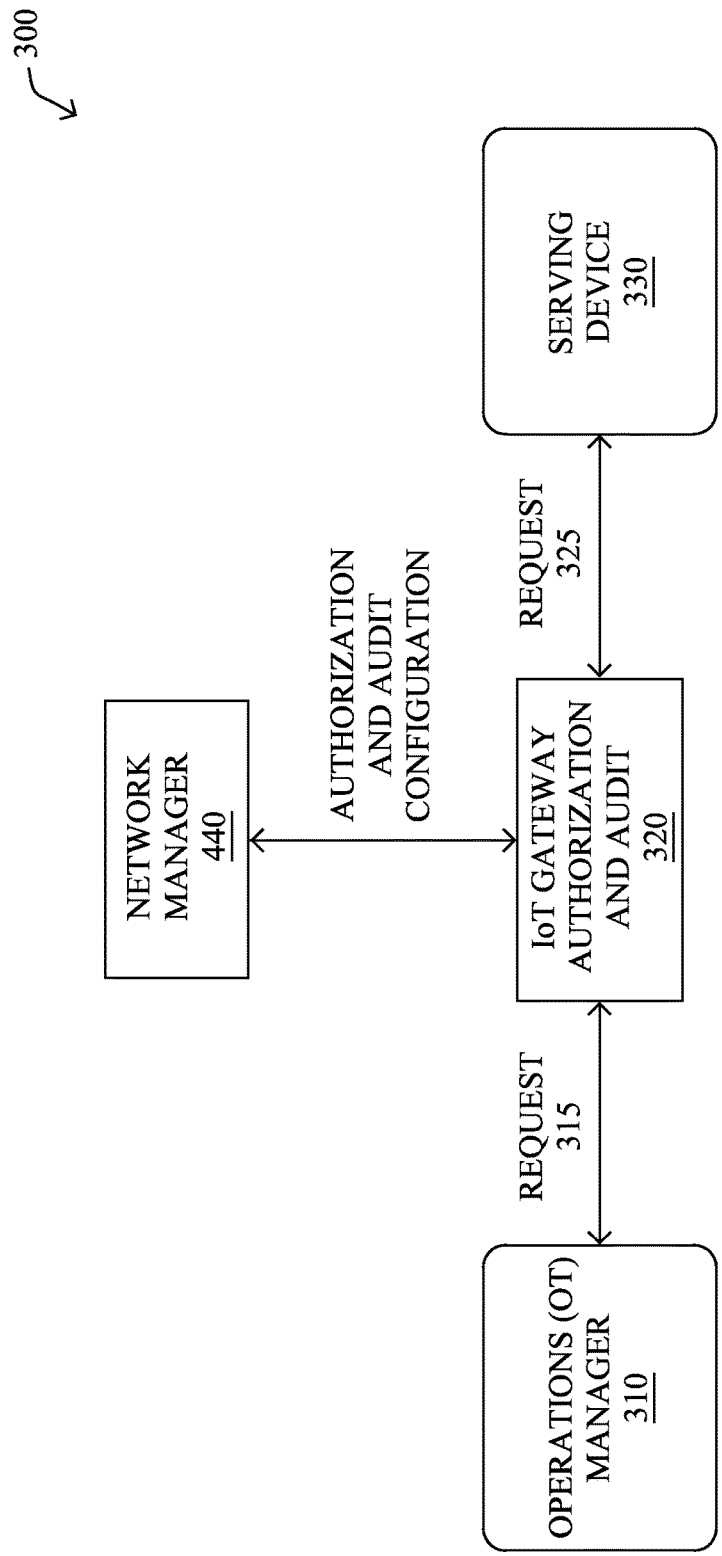
FIG. 3 illustrates an example simplified operational technology (OT) network configuration.

FIG. 3 illustrates an example simplified operational technology (OT) network configuration 300, where an operations (OT) manager 310 sends packets/requests 315 through an IoT gateway 320 to one or more serving devices 330 (e.g., as another packet/request 325), where a network manager 340 (e.g., a device manager) generally controls the configuration of the authorization and audit policies of the IoT gateway 320, as will be appreciated by those skilled in the art.

For instance, in one known SNMP-based configuration, an SNMP based OT manager 310 may send an SNMP request 315 to the IoT gateway 320 for a Modbus device 330. The IoT gateway 320 in this configuration has an SNMP to Modbus converter to perform SNMP authorization on the SNMP request 315 (based on the network manager 340 being an SNMP device manager), and then to convert the request 315 to a Modbus request 325 for the Modbus device 330. This configuration, however, is not compatible where native Modbus OT managers are used as the OT manager 310 (i.e., an OT manager that is not SNMP-aware), and instead works only with an SNMP-aware OT manager (with an SNMP device manager as network manager 340).

Alternatively, in another configuration where a native Modbus OT manager 310 is used, a Modbus request 315 is used, where the network manager 340 and IoT gateway 320 are Modbus aware, passing through the original Modbus request as request 325 after performing Modbus protocol aware authorization (and/or audit). However, in this configuration, Modbus authorization is not supported by legacy (older) Modbus devices, and all components need to be OT protocol aware.

In particular, while Modbus is an excellent industrial control system (ICS) protocol, it traditionally has no capability for authentication or authorization control. Any device with a network connection to a Modbus controller can potentially change any of the controller's input/output (I/O) points or register values. Many controllers can even be reset, disabled, or loaded with new logic or firmware code. Though Modbus, in particular, has seen recent efforts to add authentication-authorization support through Modbus/TCP Security called Modbus-SA, this Modbus-SA security-proposal does not address Legacy Modbus Serial systems. Today there are large number of legacy Modbus serial devices present in the field. Another limitation for this is the Device Manager also needs to be Modbus protocol aware.

In addition, there are different authorization techniques defined by different IoT protocols. For example, Secure Modbus includes "RoleOID" in the identity certificate. RoleOID defines the role assigned to the device that is going to exchange information. Mapping of the role to Modbus coils, inputs, input/holding registers etc., is left to the implementation. Similarly, views are defined by SNMPv3, AMP is defined by DNP3 for authorization purposes, and so on. The limitations with these techniques is that there is no standard definition of authorization/audit mapping, and no common definition across OT protocols. Thus, standard Network Managers will need customized protocol-specific extensions for authorization and audit control, and cannot do authorization/audit configuration. Also, at the network device level, this needs special implementation for each OT protocol. Further, no authorization is defined for legacy systems such as Modbus serial deployments, DNP3 before DNP3-SA, and so on.

In light of the issues above, the techniques herein, therefore, provide authorization and audit control in a multi-protocol IoT domain. In particular, the techniques herein are directed toward a solution of a protocol-independent authorization and audit control layer at a gateway device. In this layer, native protocol specific management information (e.g., OT protocol requests) is mapped into authorization protocol management information base (MIB), such as a Simple Network Management Protocol (SNMP) MIB, only for authorization and audit control purposes, passing unconverted native packets through the gateway (or dropping them) based on the enhanced authorization/audit intelligence. Further, based on the techniques herein, a standard authorization module (e.g., SNMP module) may be used uniformly across legacy and newer IoT systems for authorization and audit control.

Said differently, the techniques herein propose a dynamic multi-protocol authorization and audit control technique which can seamlessly include both legacy and newer IoT systems. Specifically, according to one or more embodiments of the disclosure as described in detail below, an authorizing device (e.g., a gateway) receives a native protocol request packet from a requesting device (e.g., OT manager) destined to a serving device, and translates the native protocol request packet into an authorization protocol mapping (e.g., SNMP mapping). The authorizing device may then apply authorization protocol based authorization to the native protocol request packet based on the authorization protocol mapping (e.g., an SNMP MIB), and transmits the native protocol request packet toward the serving device in response to the authorization protocol mapping being authorized.

Operationally, the techniques herein provide a uniform, OT protocol independent, authorization and audit control model, remaining transparent to both the requesting and serving device (i.e., where no change or extension is needed in the OT protocol, and no change is needed in the device manager as well). For instance, in the case of Modbus, no change is needed in the implementation of client/requesting and controlled/serving devices. As described below, the OT protocol-independent authorization and audit control is done at the gateway.

Figure 4:
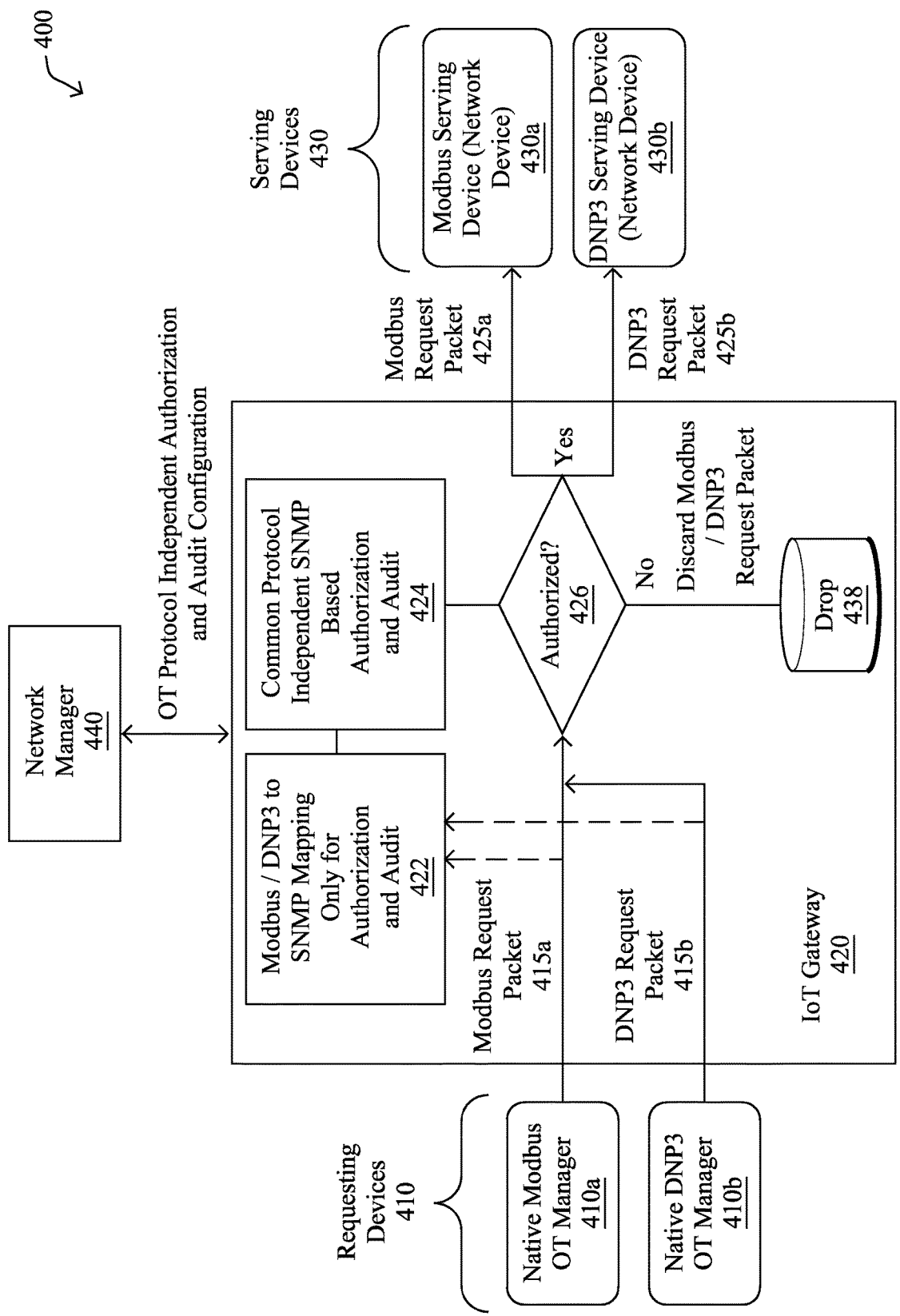
FIG. 4 illustrates an example simplified OT network configuration with authorization and audit control in a multi-protocol Internet of Things (IoT) domain in accordance with one or more embodiments described herein.

FIG. 4 illustrates an example simplified OT network configuration 400 with authorization and audit control in a multi-protocol IoT domain in accordance with one or more embodiments described herein. (Note that the illustration and discussion in FIG. 4 for the OT protocol-independent, authorization and audit control implementation shows Modbus as an example, though similar models can be defined for other OT protocols, such as DNP3, Profinet, etc.)

As shown in FIG. 4, any number of requesting devices 410, such as a native Modbus OT manager 410a, Native DNP3 OT manager 410b, or others, may communicate their native protocol request packets (415a and 415b, respectively), through the IoT gateway 420 and its associated logic as described herein, such as the authorization protocol mapping process 422 (e.g., "Modbus/DNP3 to SNMP mapping only for authorization and audit"), and the protocol independent authorization process 424 (e.g., "common protocol independent SNMP based authorization and audit"). Forwarding of the request is then managed (426—"authorized") based on the configured policies, to either discard/drop (438) the request packet, or transmit the native protocol request packet (425a and 425b, respectively) to the serving devices 430, such as Modbus serving device (network device) 430a, DNP3 serving device (network device) 430b, and so on. Notably, a network manager 440 (e.g., OT protocol unaware/agnostic) sends policies/rules to the IoT gateway 420 in the form of OT protocol independent authorization and audit configurations, as described herein. That is, the network manager remains transparent to OT protocol similar to the requesting and serving device.

Specifically, the gateway 420, upon receipt of a native (e.g., Modbus) client request packet 415a, performs authentication as per standard native (e.g., Modbus) protocol specific implementation. Subsequently, authorization is performed based on the OT protocol independent, authorization and audit control model of the techniques herein, and as described in greater detail below.

In particular, to initiate the process, the OT protocol specific management information may be mapped into an authorization protocol management information base (MIB), such as an SNMP MIB, for authorization and audit purposes. Subsequently, a protocol independent SNMP based authorization and audit module may be used which is common across legacy and newer IoT systems. Illustrative steps to achieve this are as follows:

Define an SNMP MIB for each OT protocol for the authorization and audit purpose;
Define an SNMP view with inclusion and exclusion object identifiers (OIDs);
Follow regular SNMP view-group-user mapping to define authorization configuration;
Authorize the converted SNMP MIB and instance based on view-group-user mapping; and
Forward or drop the packet as per the authorization decision.

For example, according to the techniques herein, assume that one of the requesting devices (e.g., Modbus OT manager 410a) sends a native protocol request packet 415a (e.g., Modbus request packet) to the IoT gateway 420. After authentication according to the native protocol (e.g., Modbus), the request packet is "translated" to the authorization protocol mapping (e.g., SNMP) by process 422, such that process 424 can apply OT-protocol independent authorization for the request. The results of the authorization decision are fed to control 426 to either drop or forward the original native protocol request packet (425a) to the corresponding service device (e.g., Modbus serving device 430a).

Notably, unlike traditional Modbus-SNMP converters, which convert Modbus registers to SNMP MIB, the techniques herein require no change in the client/requestor or in the serving device protocols and their implementation, as Modbus to SNMP translation is done only for authorization and audit purposes, and it remains transparent to the requestor/server communication. In fact, the SNMP MIB herein is defined dynamically, where the SNMP MIB Authorization table is created for the desired instances and attributes, where the mapping is controlled and configured by the Network Manager dynamically. SNMP views are also automatically updated based on the dynamic SNMP MIB. Note also that an OT authorization-audit SNMP MIB can be implemented by any standard SNMP manager with no customization requirements.

As an illustration for dynamic "Modbus-to-SNMP MIB" mapping:
Modbus Function codes: Each of the 16 function codes map to a different SNMP MIB table
Modbus Data Address: Each data address or address range for inclusion/exclusion translates to an entry (row) in the SNMP MIB table.
Audit attributes: Several audit attributes are included in each row of the MIB table, which can include threshold for read/write, rate of query, illegal operation etc.
Serving Device ID: Translates to instance
(Note that the entries in the table may be dynamically configured (added/deleted) by the network manager to match the authorization requirement. The inclusion and exclusion rules in the view-user-group are formed dynamically based on this table.)

Dynamically, the audit requirement for a given range of addresses (row/entry in the authorization-audit MIB table) can be configured. The audit routines cater to the dynamic audit configuration thus no change is needed in them with the change in audit requirements. Note that this audit method dynamically optimizes the size of audit logs. Also, overall, this method makes authorization and audit generic, optimized and protocol independent.

That is, for Audit log SNMP MIB mapping, for example, each of the 16 Modbus Function codes may map to an SNMP MIB table (e.g., static/fixed). Each MIB table illustratively has multiple authorization and audit attributes. FIG. 5 is an example of a sample Modbus SNMP MIB 500, showing two function codes 510 and 520, for clarity. (Note that an SNMP authorization-audit MIB illustration for other protocols such as DNP3, Profinet, CSMP, etc. can be defined in a similar manner.) Using such a MIB, for instance, can map authorizations for functions, devices, users, address ranges, etc., all of which can be dynamically configured for auditing and authorization as described herein.

Accordingly, the techniques herein enable a manger to configure authorization-audit given attributes (e.g., "views-groups-users") in a protocol (OT) independent manner, thus achieving the desired purpose across OT protocols with no change to the protocol and legacy systems.

Figure 6:
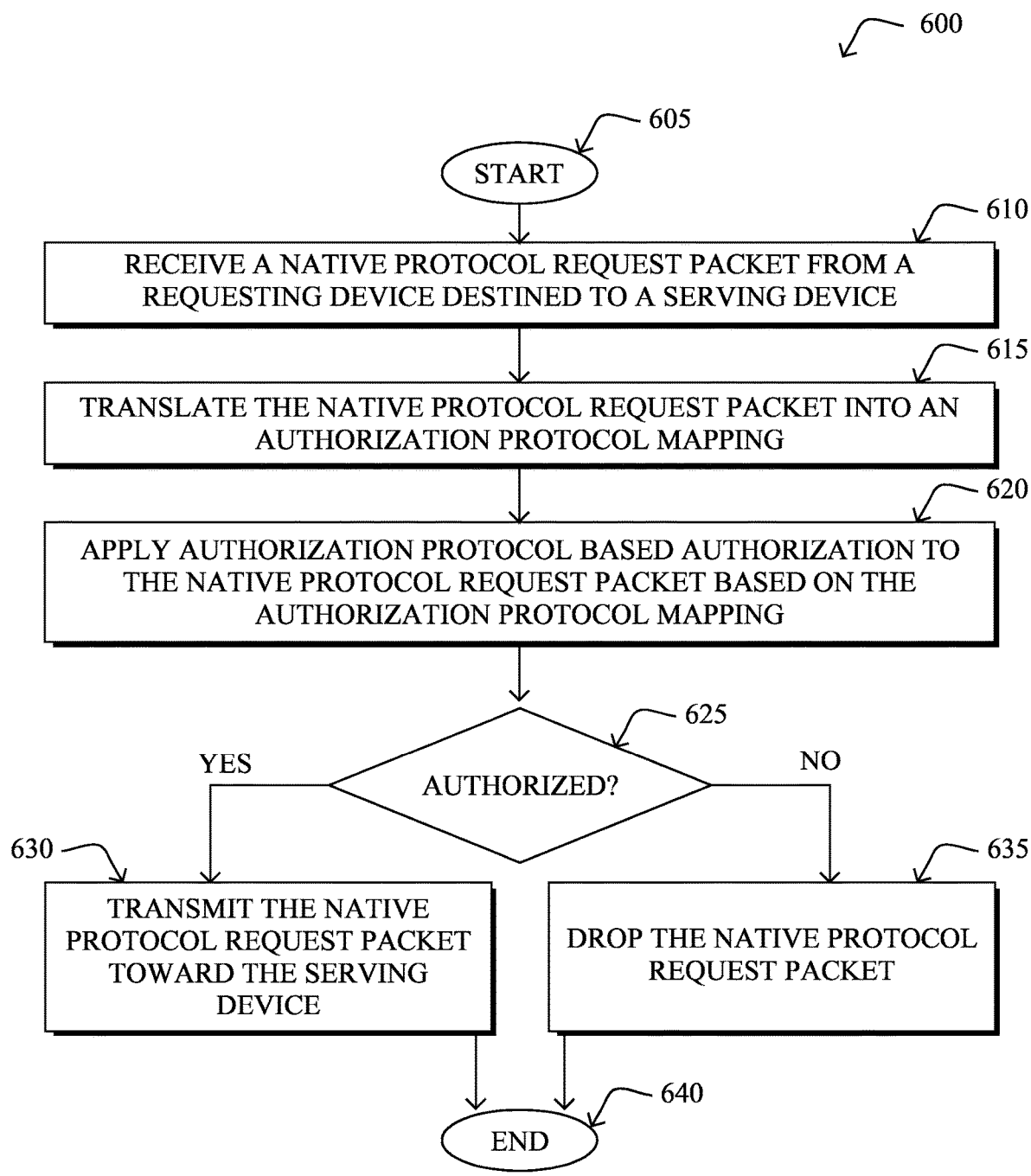
FIG. 6 illustrates an example simplified procedure for authorization and audit control in a multi-protocol IoT domain in accordance with one or more embodiments described herein.

In closing, FIG. 6 illustrates an example simplified procedure for authorization and audit control in a multi-protocol IoT domain in accordance with one or more embodiments described herein, particularly from the perspective of an authorization device (e.g., an IoT gateway 420). For example, a non-generic, specifically configured device (e.g., device 200) may perform procedure 600 by executing stored instructions (e.g., process 248). The procedure 600 may start at step 605, and continues to step 610, where, as described in greater detail above, an authorizing device (e.g., IoT gateway 420) receives a native protocol request packet from a requesting device 410 (e.g., an OT packet from an OT device manager) destined to a serving device 430. As mentioned above, the native protocol request packet may be such things as, e.g., a Modbus request packet; a DNP3 request packet, and SNMP packet, etc. In step 615 the native protocol request packet is translated into an authorization protocol mapping (e.g., based on SNMP).

In step 620, the authorizing device applies "authorization protocol based authorization" (and audit) to the native protocol request packet based on the authorization protocol mapping. (Note that this is a native protocol independent authorization, as Authorization and Audit process 424 is independent of the OT protocol of requesting devices/managers 410a and 410b.) In one embodiment, the authorization protocol based authorization is based on native protocol management information being mapped into an authorization protocol MIB (e.g., SNMP MIB), such as, for example, function code, a data address, one or more audit attributes, a service device identifier/OID, etc.). Note that there may be a respective authorization protocol MIB for each native protocol of a plurality of native protocols (e.g., Modbus, DNP3, etc.).

In step 625 it is determined whether the request packet is authorized. In response to the authorization protocol mapping being authorized, then in step 630 the native protocol request packet is transmitted toward the serving device. Alternatively, in response to the authorization protocol mapping being unauthorized, then in step 635 the native protocol request packet is dropped.

The simplified procedure 600 may then end in step 640, notably with the option to continue receiving further request packets from any of requesting device using any protocol. Other steps may also be included generally within procedure 600. For example, such steps (or, more generally, such additions to steps already specifically illustrated above), may include: performing native protocol authentication on the native protocol request packet prior to applying authorization protocol based authorization to the native protocol request packet; receiving updates to apply to the authorization protocol based authorization from a network manager; and so on.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for authorization and audit control in a multi-protocol IoT domain. In particular, the techniques herein allow for protocol agnostic authorization and auditing for multi-protocol OT/IoT environments, without altering the native communication (i.e., the native protocol packet is still passed through a gateway to the controlled devices). The dynamic authorization MIB (e.g., SNMP MIB) allows the gateway to perform native-protocol-aware authorization (policy enforcement intelligence) based on mappings, without requiring protocol conversion of the packet itself. That is, while there are several existing implementations for Modbus-SNMP conversion, for example, none of them define protocol independent authorization and audit (i.e., devices and communication need protocol specific changes), and none of them provide for native packet passthrough. In addition, the techniques herein define a new feature that may be used by IoT gateway devices, including Industrial Ethernet (IE), Industrial Routers (IR), Industrial Wireless (IW), and Connected Grid Routers (CGR), as well as IoT gateway managers, and can be helpful for IoT gateway developers, IoT middleware developers, and IoT Management solution developers.

Illustratively, the techniques described herein may be performed by hardware, software, and/or firmware, such as in accordance with the illustrative multi-protocol authorization/audit process 248, which may include computer executable instructions executed by the processor 220 to perform functions relating to the techniques described herein, e.g., in conjunction with corresponding processes of other devices in the computer network as described herein. In addition, the components herein may be implemented on a singular device or in a distributed manner, in which case the combination of executing devices can be viewed as their own singular "device" for purposes of executing the process 248.

According to the embodiments herein, an illustrative method herein may comprise: receiving, at an authorizing device, a native protocol request packet from a requesting device destined to a serving device; translating, by the authorizing device, the native protocol request packet into an authorization protocol mapping; applying, by the authorizing device, authorization protocol based authorization to the native protocol request packet based on the authorization protocol mapping; and transmitting, by the authorizing device, the native protocol request packet toward the serving device in response to the authorization protocol mapping being authorized.

In one embodiment, the method further comprises: dropping the native protocol request packet in response to the authorization protocol mapping being unauthorized.

In one embodiment, the native protocol request packet comprises an operational technology packet from an operational technology device manager.

In one embodiment, the authorization protocol mapping is based on a simple network management protocol.

In one embodiment, the method further comprises: receiving updates to apply to the authorization protocol based authorization from a network manager.

In one embodiment, the authorization protocol mapping is based on one or more of: a function code; a data address; one or more audit attributes; and a service device identifier. (Note these mappings as shown are an example (e.g., in this case, Modbus), and others are optional herein, such as for other OT protocols, accordingly.)

In one embodiment, the authorization protocol based authorization is based on native protocol management information being mapped into an authorization protocol management information base. In one embodiment, there is a respective authorization protocol management information base for each native protocol of a plurality of native protocols.

In one embodiment, the authorization protocol based authorization corresponds to an audit (e.g., includes an audit).

In one embodiment, the native protocol request packet is selected from a group consisting of: a Modbus request packet; a distributed network protocol version 3 request packet; and a simple network management protocol packet; etc. (Note these packets as shown are an example, and others are optional herein, such as for other OT protocols, accordingly.)

In one embodiment, the authorizing device is an Internet of Things gateway.

In one embodiment, the method further comprises: performing native protocol authentication on the native protocol request packet prior to applying authorization protocol based authorization to the native protocol request packet.

According to the embodiments herein, an illustrative tangible, non-transitory, computer-readable medium herein may have computer-executable instructions stored thereon that, when executed by a processor on a computer, may cause the computer to perform a method comprising: receiving a native protocol request packet from a requesting device destined to a serving device; translating the native protocol request packet into an authorization protocol mapping; applying authorization protocol based authorization to the native protocol request packet based on the authorization protocol mapping; and transmitting the native protocol request packet toward the serving device in response to the authorization protocol mapping being authorized.

Further, according to the embodiments herein an illustrative apparatus herein may comprise: a processor configured to execute one or more processes; and a memory configured to store a process that is executable by the processor, the process, when executed, configured to: receive a native protocol request packet from a requesting device destined to a serving device; translate the native protocol request packet into an authorization protocol mapping; apply authorization protocol based authorization to the native protocol request packet based on the authorization protocol mapping; and transmit the native protocol request packet toward the serving device in response to the authorization protocol mapping being authorized.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Modbus, SNMP, DNP3, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a gateway" or "by a controller" or "by a manager", those skilled in the art will appreciate that other modules, components, and/or agents may be considered to be extensions of the gateway/controller/manager operation, and as such, any process step performed "by a device" need not be limited to local processing on a specific device, unless otherwise specifically noted as such.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   receiving, at an authorizing device, a native protocol request packet from a requesting device destined to a serving device;
   translating, by the authorizing device, the native protocol request packet into an authorization protocol mapping;
   applying, by the authorizing device, authorization protocol based authorization to the native protocol request packet based on the authorization protocol mapping; and
   transmitting, by the authorizing device, the native protocol request packet toward the serving device in response to the authorization protocol mapping being authorized.

2. The method as in claim 1, further comprising:
   dropping the native protocol request packet in response to the authorization protocol mapping being unauthorized.

3. The method as in claim 1, wherein the native protocol request packet comprises an operational technology packet from an operational technology device manager.

4. The method as in claim 1, wherein the authorization protocol mapping is based on a simple network management protocol.

5. The method as in claim 1, further comprising:
   receiving updates to apply to the authorization protocol based authorization from a network manager.

6. The method as in claim 1, wherein the authorization protocol mapping is based on one or more of: a function code; a data address; one or more audit attributes; and a service device identifier.

7. The method as in claim 1, wherein the authorization protocol based authorization is based on native protocol management information being mapped into an authorization protocol management information base.

8. The method as in claim 7, wherein there is a respective authorization protocol management information base for each native protocol of a plurality of native protocols.

9. The method as in claim 1, wherein the authorization protocol based authorization corresponds to an audit.

10. The method as in claim 1, wherein the native protocol request packet is selected from a group consisting of: a Modbus request packet; a distributed network protocol version 3 request packet; and a simple network management protocol packet.

11. The method as in claim 1, wherein the authorizing device is an Internet of Things gateway.

12. The method as in claim 1, further comprising:
performing native protocol authentication on the native protocol request packet prior to applying authorization protocol based authorization to the native protocol request packet.

13. A tangible, non-transitory, computer-readable medium having computer-executable instructions stored thereon that, when executed by a processor on a computer, cause the computer to perform a method comprising:
receiving a native protocol request packet from a requesting device destined to a serving device;
translating the native protocol request packet into an authorization protocol mapping;
applying authorization protocol based authorization to the native protocol request packet based on the authorization protocol mapping; and
transmitting the native protocol request packet toward the serving device in response to the authorization protocol mapping being authorized.

14. The tangible, non-transitory, computer-readable medium as in claim 13, wherein the method further comprises:
dropping the native protocol request packet in response to the authorization protocol mapping being unauthorized.

15. The tangible, non-transitory, computer-readable medium as in claim 13, wherein the native protocol request packet comprises an operational technology packet from an operational technology device manager.

16. The tangible, non-transitory, computer-readable medium as in claim 13, wherein the authorization protocol mapping is based on a simple network management protocol.

17. The tangible, non-transitory, computer-readable medium as in claim 13, wherein the method further comprises:
receiving updates to apply to the authorization protocol based authorization from a network manager.

18. The tangible, non-transitory, computer-readable medium as in claim 13, wherein the authorization protocol mapping is based on one or more of: a function code; a data address; one or more audit attributes; and a service device identifier.

19. The tangible, non-transitory, computer-readable medium as in claim 13, wherein the authorization protocol based authorization is based on native protocol management information being mapped into an authorization protocol management information base.

20. An apparatus, comprising:
a processor configured to execute one or more processes; and
a memory configured to store a process that is executable by the processor, the process, when executed, configured to:
receive a native protocol request packet from a requesting device destined to a serving device;
translate the native protocol request packet into an authorization protocol mapping;
apply authorization protocol based authorization to the native protocol request packet based on the authorization protocol mapping; and
transmit the native protocol request packet toward the serving device in response to the authorization protocol mapping being authorized.

* * * * *